(12) United States Patent
Obert et al.

(10) Patent No.: US 9,499,131 B2
(45) Date of Patent: Nov. 22, 2016

(54) WIPER BLADE ADAPTER DEVICE

(75) Inventors: Mike Obert, Gernsbach (DE); Andreas Benner, Taipei (TW); Eckhard Lichtenthaler, Karlsruhe-Hohenwettersbach (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 14/111,755

(22) PCT Filed: Mar. 9, 2012

(86) PCT No.: PCT/EP2012/054104
§ 371 (c)(1),
(2), (4) Date: Oct. 14, 2013

(87) PCT Pub. No.: WO2012/139824
PCT Pub. Date: Oct. 18, 2012

(65) Prior Publication Data
US 2014/0033467 A1    Feb. 6, 2014

(30) Foreign Application Priority Data
Apr. 13, 2011 (DE) .................. 10 2011 007 247

(51) Int. Cl.
*B60S 1/40* (2006.01)
*B60S 1/38* (2006.01)

(52) U.S. Cl.
CPC .............. *B60S 1/40* (2013.01); *B60S 1/3858* (2013.01); *B60S 1/381* (2013.01); *B60S 1/387* (2013.01); *B60S 1/3849* (2013.01); *B60S 1/3879* (2013.01); *B60S 1/3886* (2013.01); *B60S 2001/4096* (2013.01)

(58) Field of Classification Search
CPC ............... B60S 1/40; B60S 1/3848; B60S 1/3849; B60S 1/3853; B60S 1/3858; B60S 2001/4058
USPC ......................... 15/250.32, 250.33
See application file for complete search history.

(56) References Cited

U.S. PATENT DOCUMENTS

2010/0186185 A1* 7/2010 Grasso ............... B60S 1/387
15/250.32
2010/0242204 A1  9/2010 Chien

FOREIGN PATENT DOCUMENTS

| DE | 102009000762 | | 8/2010 |
| DE | 102009002764 | | 11/2010 |
| EP | 0141186 | * | 8/1987 |
| GB | 2361414 A | * | 10/2001 |
| RU | 2007127920 | | 1/2009 |
| WO | 2010028918 | | 3/2010 |
| WO | 2010124896 | | 11/2010 |

OTHER PUBLICATIONS

International Search Report for Application No. PCT/EP2012/054104 dated Jul. 18, 2012 (2 pages).

* cited by examiner

*Primary Examiner* — Gary Graham
(74) *Attorney, Agent, or Firm* — Michael Best & Friedrich LLP

(57) ABSTRACT

The invention relates to a wiper blade adapter device having a wiper arm adapter (10) and a wiper blade adapter (12). The wiper blade adapter device comprises a pivot bearing unit (14) which is provided to rotatably mount the wiper arm adapter (10) and the wiper blade adapter (12) in an assembly process relative to each other around a longitudinal axis (16) of the wiper blade adapter (12).

8 Claims, 3 Drawing Sheets

WIPER BLADE ADAPTER DEVICE

BACKGROUND OF THE INVENITON

Wiper blade adapter devices having a wiper arm adapter and a wiper blade adapter are already known from the prior art.

SUMMARY OF THE INVENTION

The invention relates to a wiper blade adapter device having a wiper arm adapter and a wiper blade adapter.

According to the invention, the wiper blade adapter device comprises a pivot bearing unit which is provided to rotatably mount the wiper arm adapter and the wiper blade adapter in an assembly process relative to each other around a longitudinal axis of the wiper blade adapter. A fast and intuitive assembly process can thereby be achieved for a user. "Wiper arm adapter" refers in this context particularly to an adapter which has a contact area with a wiper arm component and is provided to furnish a coupling area of the wiper arm component for coupling and/or contacting with a wiper blade adapter. The wiper arm component can preferably be attached to a wiper arm. A "wiper blade adapter" refers in this context particularly to an adapter which has a contact area with a wiper blade component, is undetachably connected to the wiper blade component and is provided to furnish a coupling area of the wiper blade component for coupling and/or contacting with a wiper arm adapter. "Longitudinal axis of the wiper blade adapter" refers in this context particularly to an axis which is disposed parallel to a support surface of the wiper blade adapter and substantially parallel to a main longitudinal extension of the wiper blade adapter. "Support surface" refers in this context particularly to a planar surface on which the wiper arm adapter is placed in an assembly process and/or which is provided to transmit a main contact pressing force of the wiper arm adapter onto the wiper blade adapter. A "main contact pressing force" refers in this context particularly to a force which presses the wiper blade adapter and/or a wiper blade in the direction of a surface to be wiped, such as in particular a vehicle window pane. A "main longitudinal extension" refers in this context particularly to an extension which is as large as possible. By the term "extension" of an element, particularly a maximum distance between two points of a perpendicular projection of the element onto a plane is to be understood. By the term "substantially", particularly a deviation of less than 20° is to be understood in this context. The longitudinal axis preferably extends parallel to side walls of the wiper blade adapter. The term "provided" refers to being specially designed and/or equipped.

In a further embodiment of the invention, it is proposed that the wiper blade adapter device comprises a detent unit which is provided to form a latching connection between the wiper arm adapter and the wiper blade adapter in an assembled state, whereby a particularly simple securing of the wiper blade adapter device can be achieved in an assembled state. By the term "detent unit", a mechanism is to be understood which comprises at least one detent element which is elastically deflected in an assembly process in order to subsequently engage into a corresponding detent recess by means of internal clamping force.

It is further proposed that the detent unit comprises at least one detent means that is disposed on the wiper arm adapter. In so doing, a particularly secure latching connection can be produced and/or the at least one detent means can be designed to be readily accessible to a user and/or a handling of the at least one detent means, for example for disassembly, can easily occur. "Detent means" refers in this context particularly to a resilient means for producing a latching connection, which means is intended to resiliently deflect during an assembly process.

In addition, it is proposed that the at least one detent means is intended to be deflected about the longitudinal axis during an assembly process. The detent means can thereby distribute a load across a particularly large surface area, which can lead to less stress being placed on the wiper blade adapter device and/or a high durability of the same.

If the detent unit comprises at least one detent recess which is disposed on the wiper blade adapter, the detent unit can be configured in a particularly space-saving manner. By the term "detent recess", a recess is to be particularly understood in this context which corresponds to a detent means and/or is provided to receive the detent means in an assembled state.

The invention further proposes that the at least one detent recess is at least partially disposed in a side wall and at least partially within a base body of the wiper blade adapter. "Side wall" refers in this context particularly to a wall which, in an assembled state, is provided to furnish a stop for the wiper arm adapter in a direction that extends parallel to the support surface of the wiper blade adapter. The side wall preferably absorbs exclusively forces between wiper arm adapter and wiper blade adapter, which forces run parallel to the support surface of the wiper blade adapter. "Base body of the wiper blade adapter" refers in this context particularly to a body which is provided to absorb forces between wiper arm adapter and wiper blade adapter that are applied perpendicularly to the support surface.

In a further embodiment of the invention, it is proposed that the pivot bearing unit has at least one bearing means which is disposed on the wiper arm adapter. In so doing, a space-saving and stable rotatable mounting of the wiper arm adapter and the wiper blade adapter can be achieved. By the term "bearing means", a component is particularly to be understood in this context which provides a bearing surface for coupling and/or contacting a component to be mounted. In an additional embodiment, it is proposed that the at least one bearing means is formed in one piece with a base body of the wiper arm adapter. The term "formed in one piece" refers to being materially bonded, such as, for example, by means of a welding process and/or an adhesive bonding process etc., and in a particularly advantageous manner to being integrally formed with said base body, such as being cast in one piece with said base body and/or being produced in a single- or multi-component injection molding process.

A particularly stable embodiment of the pivot bearing unit can be achieved if said pivot bearing unit has at least one bearing recess which is disposed on the wiper blade adapter. The term "bearing recess" refers in this context particularly to a recess which corresponds to the bearing means in the form thereof and/or which is provided to receive the bearing means in an assembled state.

A particularly stable embodiment of the pivot bearing unit can be achieved if the at least one bearing recess is disposed at least partially in a side wall and at least partially within a base body of the wiper blade adapter.

BRIEF DESCRIPTION OF THE DRAWINGS

Further advantages ensue from the following description of the drawings. In the drawings, an exemplary embodiment of the invention is depicted. The drawings, the description and the claims contain numerous features in combination.

The person skilled in the art will expediently consider the features individually and put them together in useful further combinations.

In the drawings:

FIG. 1 shows an exploded view of a wiper blade adapter device according to the invention.

FIG. 2 shows a perspective view of the wiper blade adapter device according to FIG. 1 in a first assembly step.

FIG. 3 shows a perspective view of the wiper blade adapter device according to FIG. 1 in a further assembly step.

FIG. 4 shows a perspective view of the wiper blade adapter device according to FIG. 1 in an assembled state; and FIG. 5 show a sectional view along the intersection line V-V from FIG. 4.

DETAILED DESCRIPTION

Figure 1:
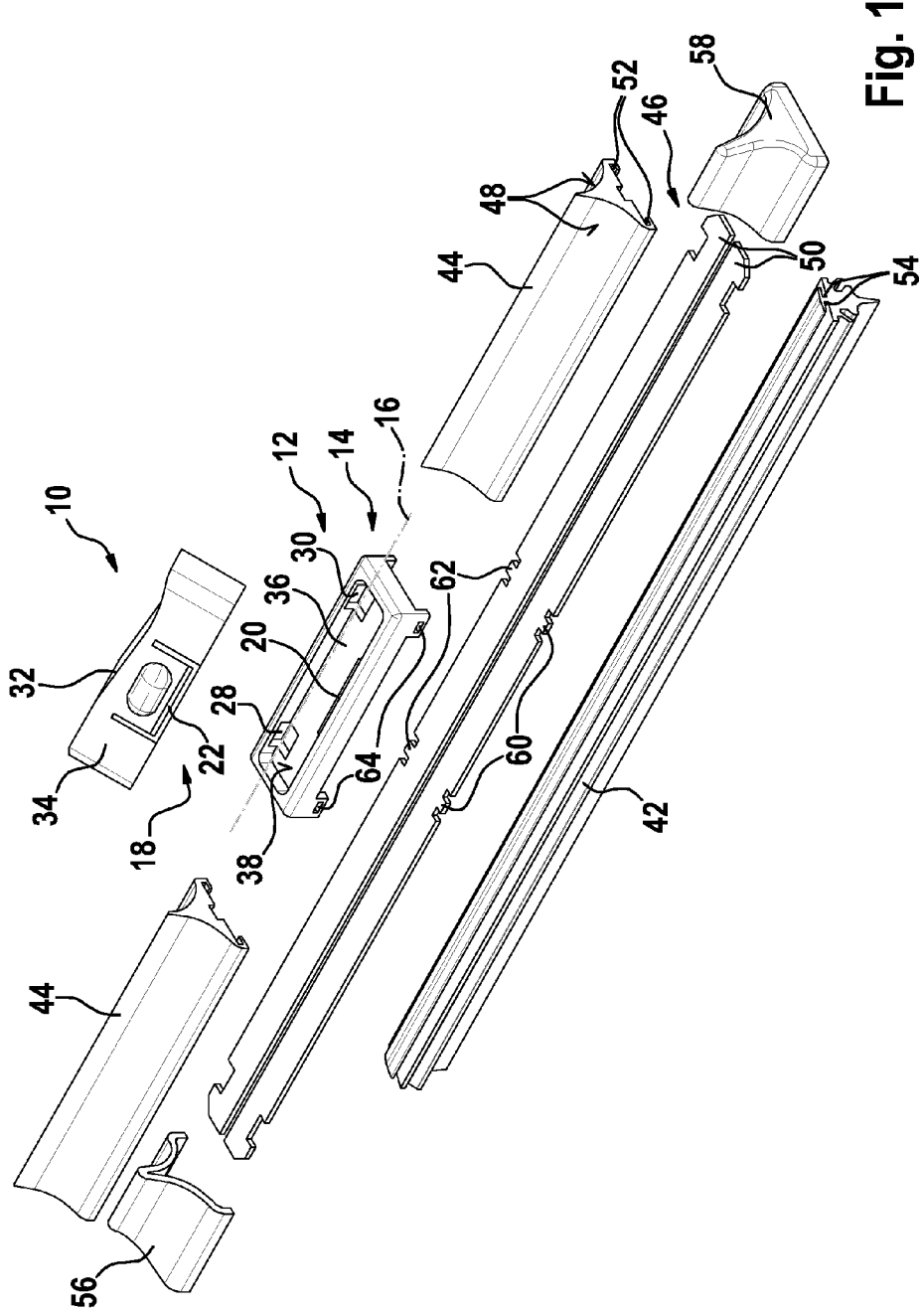

FIG. 1 shows an exploded view of an inventive wiper blade adapter device comprising a wiper arm adapter 10 and a wiper blade adapter 12. The wiper arm adapter 10 can be detached from the wiper blade adapter 12 and therefore is designed to be replaceable. The wiper arm adapter 10 has an interface with a wiper arm (not shown). Depending on the embodiment of the wiper arm, the wiper arm adapter has to be replaced 10. Embodiments of said interface of the wiper arm adapter 10 are generally known by the person skilled in the art and are not depicted for reasons of clarity. The wiper blade adapter device further comprises a detent unit 18 for the engagement of the wiper arm adapter 10 with the wiper blade adapter 12. The wiper arm adapter 10 has a base body 32, which includes a detent means 22 of the detent unit 18 on a side wall 34. The detent means 22 is designed in one piece with the base body 32. The detent means 22 can be deflected about a longitudinal axis 16 by maximally five millimeters.

The wiper blade adapter 12 comprises a base body 36. The base body 36 comprises a planar support surface 38. In addition, the base body 36 is formed from a plastic injection molded part. It is also conceivable in this context to form the base body 36 from a metal part, such as in particular from sheet metal.

The longitudinal axis 16 is disposed parallel to the support surface 38 of the wiper blade adapter 12. The support surface 38 serves as an abutment face for the wiper arm adapter 10. The wiper arm adapter 10 is placed on the support surface 38 during an assembly process. In addition, the longitudinal axis 16 is disposed perpendicularly to a main contact pressing force 40 of the wiper arm adapter 10. The main contact pressing force 40 is generated by a torque of the wiper arm and presses the wiper blade adapter 12 and a wiper blade 42, which is connected to the wiper blade adapter 12 and is jointless, in the direction of a vehicle window pane to be wiped (not depicted).

A wind deflector element 44, a support element 46 and the wiper blade 42 are disposed on the wiper blade adapter device. The wind deflector element 44 comprises two symmetrically configured, concave wind deflector surfaces 48, which deflect an airstream occurring in an operating state and thereby increase the main contact pressing force 40. In addition, the wind deflector element is two-parted, i.e. formed by two separate components. The support element 46 comprises two spring rails 50. It is however also conceivable in this context to employ a one-piece spring rail as support element. The support element 46 is inserted into a longitudinal guide rail 52 of the wind deflector element 44 during assembly. The wiper blade 42 is then held on both sides by the spring rails 50. To this end, the wiper blade 42 has a receiving groove 54 for the support element 46 on each side. Two end caps 56, 58 lock the support element 46 respectively at one end, as viewed parallel to the longitudinal axis 16, and prevent the spring rails 50 from coming out of the receiving groove 54. In the assembled state, the wiper blade 42 is thus connected via the support element 46 to the wind deflector element 44 (FIG. 2).

The support element 46 has four attachment lugs 60, 62. In each case, two attachment lugs 60 point in a direction which runs opposite to a direction of the other two attachment lugs 62. The base body 36 of the wiper blade adapter 12 comprises four attachment recesses 64 which correspond to the attachment lugs 60, 62 in the form thereof. When mounting the wiper blade adapter 12 to the support element 46, the attachment lugs 60, 62 are inserted into the attachment recesses 64. Many additional attachment methods for attaching the support element 46 to the wiper blade adapter 12, which would appear useful to the person skilled in the art, are furthermore conceivable, such as in particular inserting a support element into a guide rail of the wiper blade adapter. It is furthermore conceivable for a support element to enclose the base body. In addition, it is also conceivable to adhesively bond, screw and/or rivet the support element to the base body. If the base body of the wiper blade adapter is formed by a metal part, the support body can be connected to said base body by means of a welded or soldered connection.

Figure 2:
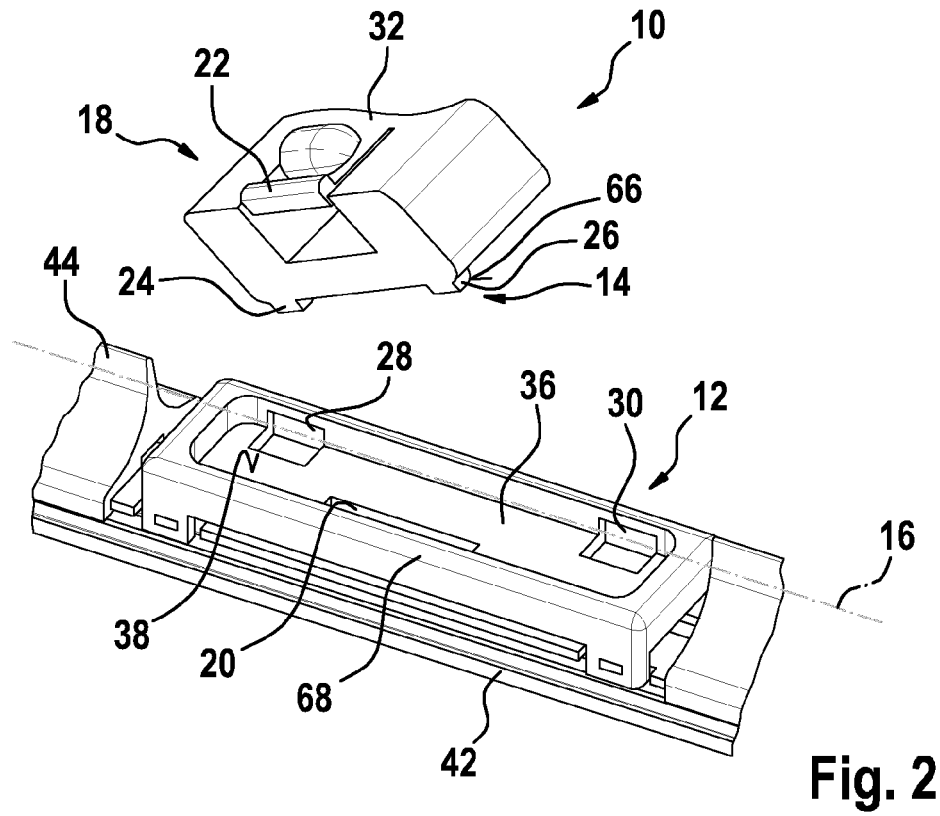

FIG. 2 shows a perspective view of the wiper blade adapter device prior to assembly. The wind deflector element 44, the support element 46 and the wiper blade 42 are undetachably connected to the wiper blade adapter 12. The wiper blade adapter device comprises a pivot bearing unit 14. The pivot bearing unit 14 is provided to rotatably mount the wiper arm adapter 10 and the wiper blade adapter 12 in an assembly process relative to each other around the longitudinal axis 16. To this end, the pivot bearing unit 14 comprises two bearing means 24, 26.

The bearing means 24, 26 are embodied in one piece with the base body 32 of the wiper arm adapter 10. It is however also conceivable in this context for the bearing means 24, 26 to be connected to the base body 32 in a positive-locking and/or force fitting manner, such as in particular by means of a screw and/or rivet connection. The bearing means 24, 26 are ashlar-shaped. The bearing means 24, 26 provide a bearing surface 66 for contacting the wiper blade adapter 12. Two bearing recesses 28, 30 are disposed in the base body 36 and in a side wall 68 of the wiper blade adapter. The bearing recesses 28, 30 correspond to the bearing means 24, 26 in the geometric form thereof. When inserting the bearing means 24, 26 into the bearing recesses 28, 30 the bearing surface 66 contacts the base body 36 of the wiper blade adapter 12 within the bearing recesses 28, 30.

In addition to the detent means 22, the detent unit 18 comprises a detent recess 20 which is disposed in the side wall 68 and in the base body 36 of the wiper blade adapter 12. The side wall 68 is embodied in one piece with the base body 36 and forms a lateral stop for the wiper arm adapter 10 in an assembled state. The side wall 68 of the wiper blade adapter 12 extends, starting at the support surface 38 of the base body 36, perpendicularly to said support surface 38.

Figure 3:
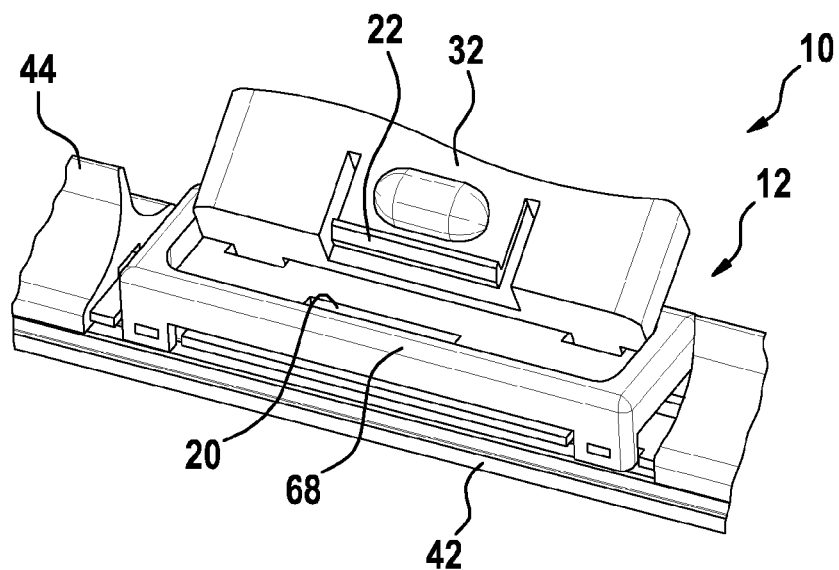

In FIG. 3, the wiper blade adapter device is shown in a first assembly step. The wiper arm adapter 10 is placed obliquely on the wiper blade adapter 12. The bearing means 24, 26 are inserted in the bearing recesses 28, 30 and form a positive-locking connection with the same. The side wall 68 partially surrounds the wiper arm adapter 10 in a direction parallel to the longitudinal axis 16. The bearing means 24, 26 inserted into the bearing recesses 28, 30 allow a rotational movement of the wiper arm adapter 10 relative to the wiper blade adapter 12 around the longitudinal axis 16.

When the wiper arm adapter 10 is rotated relative to the wiper blade adapter 12 around the longitudinal axis 16, the bearing means 24, 26 completely engage in the bearing recesses 28, 30. This prevents the wiper arm adapter 10 from detaching from the wiper blade adapter 12. The side wall 68 consequently prevents a movement of the wiper arm adapter 10 relative to the wiper blade adapter 12 parallel to the longitudinal axis 16. The detent means 22 is deflected about the longitudinal axis 16 during the assembly process. In so doing, said detent means 22 is moved in an end region of the side wall 68 in the direction of the bearing recesses 28, 30.

Figure 4:
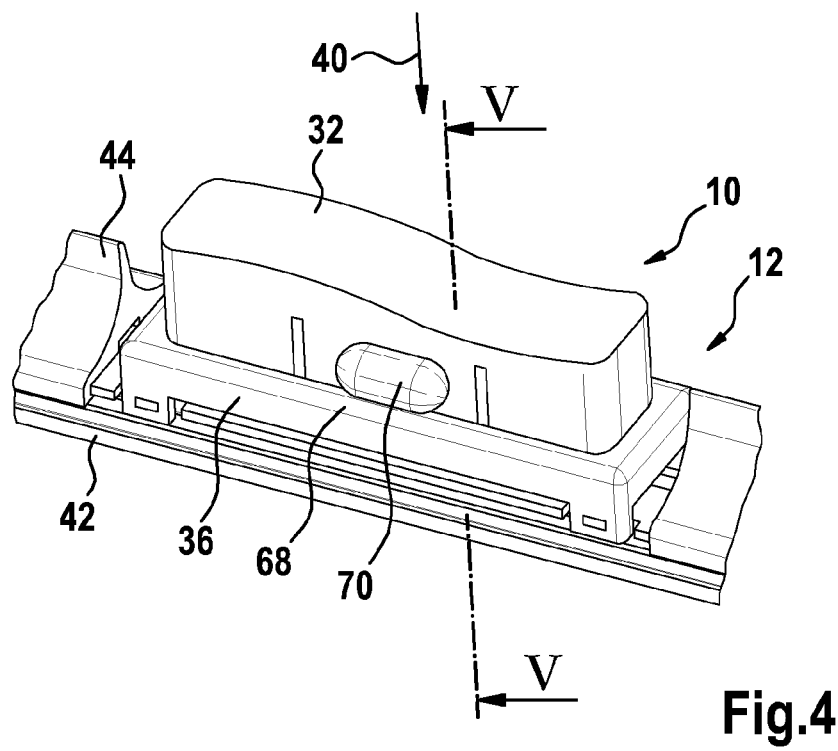
Figure 5:
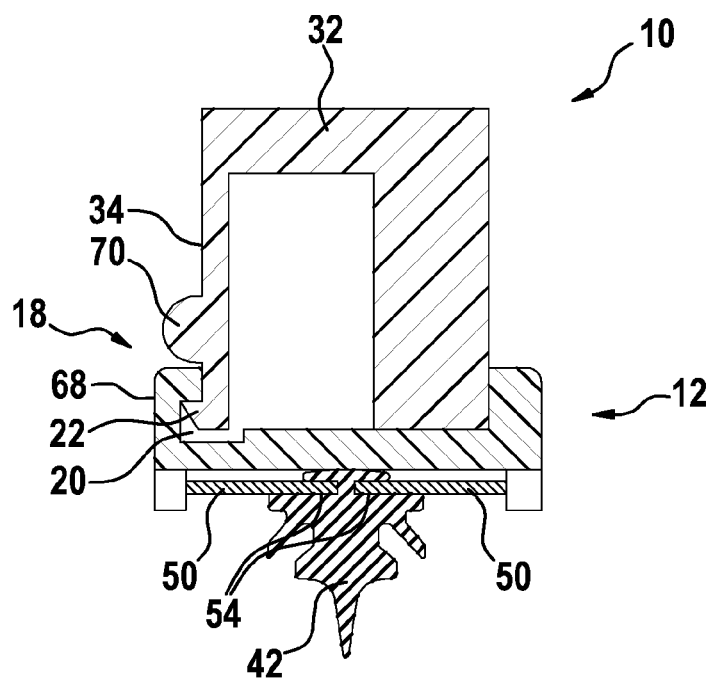

FIGS. 4 and 5 show the wiper blade adapter device in an assembled state. The detent means 22 is disposed in a positive-locking manner within the detent recess 20. The detent unit 18 forms a latching connection between the wiper arm adapter 10 and the wiper blade adapter 12. A movement of the wiper arm adapter 10 relative to the wiper blade adapter 12 perpendicularly to the support surface 38 is prevented in the assembled state by the detent means 22 and by the bearing means 24, 26.

In the assembled state, the detent means 22 and the bearing means 24, 26 transmit operating forces, which occur and run perpendicularly to the longitudinal axis 16, directly from the wiper arm adapter 10 to the wiper blade adapter 12. Operating forces resulting parallel to the longitudinal axis 16 are transmitted from the side wall 68 to the base body 32 of the wiper arm adapter 10.

It is possible to release the latching connection by a deflection of the detent means 22. To this end, the detent means 22 comprises an operator control 70 which is intended to provide an operating surface for an operator. The operator control 70 comprises a half-round, cylindrical body, which is formed integrally with the base body 32. If pressure is exerted on the operator control 70, the detent means 22 is moved against the inner resilience thereof out of the corresponding detent recess. The wiper arm adapter 10 is subsequently rotated relative to the wiper blade adapter 12 around the longitudinal axis. In so doing, the base body 32 is released on one side from the side wall 68, and the bearing means 24, 26 can be taken out of the bearing recesses 28, 30.

What is claimed is:

1. A wiper blade adapter device having a wiper arm adapter (10) and a wiper blade adapter (12), characterized by a pivot bearing unit (14) which is provided to rotatably mount the wiper arm adapter (10) and the wiper blade adapter (12) in an assembly process relative to each other around a longitudinal axis (16) of the wiper blade adapter (12), wherein the wiper blade adapter device further includes a detent unit (18), which is provided to form a latching connection between the wiper arm adapter (10) and the wiper blade adapter (12) in an assembled state, wherein the wiper arm adapter (10) is separate from and removably coupleable to the wiper blade adapter (12), wherein the wiper blade adapter (12) includes a support surface (36) for supporting the wiper arm adapter (10), wherein the pivot bearing unit (14) includes at least one bearing recess (28, 30) that extends into the support surface (36) along a first side of the support surface (36), and wherein the detent unit (18) includes at least one detent recess (20) that extends into the support surface (36) along a second, opposite side of the support surface (36), and the detent unit (18) also includes at least one detent means (22) disposed on the wiper arm adapter (10), wherein to rotatably mount the wiper arm adapter (10) to the wiper blade adapter (12) at least one bearing means (24, 26) extending from the wiper arm adapter (10) is inserted into the at least one bearing recess (28, 30) and the wiper arm adapter (10) is then pivoted and rotated about the at least one bearing means (24, 26) until the detent means (22) latches into the detent recess (20).

2. The wiper blade adapter device according to claim 1, characterized in that the at least one detent means (22) is provided to be deflected about the longitudinal axis (16) in an assembly process.

3. The wiper blade adapter device according to claim 1, characterized in that the at least one detent recess (20) extends into both the support surface (36) and a first side wall (68) at an intersection of the support surface (36) and the first side wall (68), and wherein the at least one bearing recess (28, 30) extends into both the support surface (36) and a second side wall (68) at an intersection of the support surface (36) and the second side wall (68), wherein the first and second side walls (68) each extend generally perpendicular to the support surface (36).

4. The wiper blade adapter device according to claim 3, further comprising a third side wall (68) and a fourth side wall (68), wherein the first side wall (68), the second side wall (68), the third side wall (68), and the fourth side wall (68) each extend generally perpendicular to the support surface (38) and are coupled together to surround the support surface (36).

5. The wiper blade adapter device according to claim 1, wherein the at least one bearing recess (28, 30) includes two separately spaced bearing recesses (28, 30), and wherein the at least one bearing means (24, 26) includes two separately spaced projections (24, 26) on the wiper arm adapter (10) that are sized and shaped to fit into the two separately spaced bearing recesses.

6. The wiper blade adapter device according to claim 1, wherein the at least one detent means (22) includes a deflectable, cut-out tab along a side of the wiper arm adapter (10).

7. The wiper blade adapter device according to claim 1, wherein the at least one bearing means (24, 26) includes a first projection (24) extending from the wiper arm adapter (10) and a second projection (26) extending from the wiper arm adapter (10).

8. A wiper comprising:
a wiper blade (42);
a spring rail (50) coupled to the wiper blade (42); and
the wiper blade adapter device according to claim 1, wherein the wiper blade adapter device is coupled to the wiper blade (42), and wherein the support surface (36) extends parallel to the spring rail (50).

\* \* \* \* \*